United States Patent [19]

Johns

[11] Patent Number: 5,796,257
[45] Date of Patent: Aug. 18, 1998

[54] DETECTING FAULTS IN POWER LINES

[75] Inventor: Allan Thomas Johns, Swindon, Great Britain

[73] Assignee: The University of Bath, Bath, Great Britain

[21] Appl. No.: 872,144

[22] Filed: Jun. 10, 1997

Related U.S. Application Data

[63] Continuation of Ser. No. 379,453, filed as PCT/GB93/01790, Aug. 23, 1993 published as WO94/06026, Mar. 17, 1994, abandoned.

[30] Foreign Application Priority Data

Aug. 27, 1992 [GB] United Kingdom ............... 9218206

[51] Int. Cl.$^6$ ................................................ G01R 31/08
[52] U.S. Cl. ................................... 324/520; 361/113
[58] Field of Search .............................. 324/520, 505, 324/510; 361/113

[56] References Cited

U.S. PATENT DOCUMENTS

| | | | |
|---|---|---|---|
| 4,218,718 | 8/1980 | Sun | 361/83 |
| 4,528,497 | 7/1985 | Arato | 324/520 |
| 4,560,922 | 12/1985 | Heller et al. | |
| 4,570,231 | 2/1986 | Bunch | |
| 4,639,817 | 1/1987 | Cooper | 361/113 |
| 4,871,971 | 10/1989 | Jeerings et al. | |
| 4,903,163 | 2/1990 | Atwater | 361/113 |
| 4,922,368 | 5/1990 | Johns | 361/62 |
| 5,185,686 | 2/1993 | Hansen | 324/536 |
| 5,200,737 | 4/1993 | Konishi | 324/520 |
| 5,383,084 | 1/1995 | Gershen | 324/520 |
| 5,587,662 | 12/1996 | Kelley | 324/520 |

FOREIGN PATENT DOCUMENTS

| | | |
|---|---|---|
| 318274A2 | 5/1989 | European Pat. Off. |
| 358488A2 | 3/1990 | European Pat. Off. |
| 2037508 | 7/1980 | United Kingdom |
| 2070869 | 9/1981 | United Kingdom |
| 2212998 | 8/1989 | United Kingdom |

Primary Examiner—Ernest F. Karlsen
Assistant Examiner—Jose M. Solis
Attorney, Agent, or Firm—Burns, Doane, Swecker & Mathis, LLP

[57] ABSTRACT

A system for detecting a fault in a power line (1) includes, in the power line (1), a first circuit (4) capable of attenuating signals within a first frequency band, which is centered on a first frequency, substantially more than it attenuates signals outside the first frequency band, and, a second circuit (5) connected to the power line (1) on one side of the first circuit (4), the second circuit (5) being capable of extracting signals within a second frequency band that includes the first frequency. The relative levels of two signals extracted by the second circuit (5), are detected and signalled, the two signals being at respective frequencies which the first circuit is capable of attenuating by different relative amounts.

23 Claims, 2 Drawing Sheets

DETECTING FAULTS IN POWER LINES

This application is a continuation of Application Ser. No. 08/379,453, filed as PCT/GB93/01790, Aug. 23, 1993 published as WO94/06026, Mar. 17, 1994 now abandoned.

BACKGROUND OF THE INVENTION

This invention relates to an apparatus and method for detecting a fault in power lines.

Electrical power lines which may, for example, operate at 400 kV at a frequency of 50 Hz, as in the case of the national grid in the United Kingdom, need to be protected and it is desirable that a section of the power line developing a fault is immediately isolated from the remainder of the system. It is important for a fault detection system to be able to distinguish between a fault inside the protected section, in which case the section should be immediately isolated, and a fault outside the protected section, in which case the section should not be isolated.

It is known that high frequency signals are generated under fault conditions and there have already been proposals to use the high frequency signals as an indication of a fault condition. Such proposals have not, however, been entirely satisfactory.

OBJECTS AND SUMMARY

It is an object of the invention to provide an improved method and apparatus for detecting a fault in a power line.

The invention provides a method of detecting a fault in a power line including the steps of:

providing, in the power line, a first circuit capable of attenuating signals within a first frequency band, which is centred on a first frequency, substantially more than it attenuates signals outside the first frequency band, providing a second circuit connected to the power line on one side of the first circuit, the second circuit being capable of extracting signals within a second frequency band that includes the first frequency, and detecting and signalling the relative levels of two signals extracted by the second circuit, the two signals being at respective frequencies which the first circuit is capable of attenuating by different relative amounts.

The power line will usually be an overhead line but it may be an underground cable.

The presence of the two signals extracted by the second circuit indicates that there is a fault on the line or some other part of the system and the relative magnitudes of those two signals, after extraction by the second circuit, indicates the direction from which the fault energy has come relative to the first circuit.

Fault energy coming from one direction must pass through the first circuit in order to be extracted by the second circuit and that fault energy is subjected to the attenuation characteristic of the first circuit in which the energy at one frequency is attenuated more than the energy at the other frequency. Fault energy coming from the opposite direction does not pass through the first circuit and neither frequency suffers substantial attenuation. Placing the second circuit "inboard" to the line and the first circuit "outboard" to the line provides a fault sensing arrangement in which only fault energy originating "outboard" to the line passes through the first circuit.

In a preferred embodiment of the invention to be described there are two first circuits at opposite ends of a protected section of the line. In that case, only fault energy originating outside the protected section of the line passes through one of the first circuits and therefore the relative levels of the two extracted signals indicate whether or not the fault originates inside or outside the protected section of the line.

Preferably, the two signals extracted by the second circuit are such that one of their frequencies lies within the first frequency band and the other frequency lies outside the first frequency band.

Since the first circuit is capable of attenuating signals within the first frequency band, the signal in that frequency band is attenuated when it passes through the first circuit whereas the signal at the other frequency passes through the first circuit substantially unattenuated. There is attenuation of the signal in the first frequency band only when it comes from the direction requiring it to pass through the first circuit and, because of that, the fault detection method is capable of indicating both that there is a fault and the source of the fault relative to the first and second circuits.

Preferably, one of the signals extracted by the second circuit has substantially the frequency on which the first frequency band is centred.

The use of the frequency on which the first frequency band is centred provides a method whereby one of the signals suffers substantial attenuation when it passes through the first circuit to reach the second circuit. That means that in the case where one signal is attenuated the relative level of the attenuated signal to the other signal is very small and in the case where there is no attenuation of that signal the levels of the signals may be about equal. There is, therefore, a high level of discrimination possible between the two conditions.

The method may comprise detecting and signalling the relative levels of respective first and second pluralities of signals extracted by the second circuit, the first plurality of signals covering a first frequency range which is attenuated substantially more than the frequency range of the second plurality of signals. Thus, a first range of frequencies may be used to provide one signal and a second range of frequencies, separated from the first range, may be used to provide the other signal.

The most convenient form of the first circuit is a tuned circuit including capacitive and inductive elements.

Preferably, actuation of a circuit breaker in the power line is dependent upon the relative levels of the signals extracted by the second circuit and preferably the circuit breaker is actuated only if the signals are ascertained not to have been substantially attenuated by the first circuit.

The first frequency is preferably between 10 kHz and 500 kHz. The usual frequency of operation of a power system is 50 Hz or 60 Hz and a frequency of maximum attenuation by the first circuit is preferably very much higher. Preferably the first frequency is about 60 kHz.

The second frequency band may have a bandwidth of 10 to 50 kHz and preferably has a bandwidth of about 20 kHz. We have found that a bandwidth of about 20 kHz is suitable for a wide variety of fault conditions.

Preferably, the step of detecting the relative levels of the extracted signals comprises ascertaining the ratio of the magnitude of the signals in one frequency range to the magnitude of the signals in the other frequency range. The absolute levels of the signals will vary according to the nature of the fault and its position but the ratio of the magnitudes of the signals in the two frequency ranges provide a clear indication of whether or not the fault is in the protected section of the line.

The same fault detection method is preferably carried out at both ends of a length of the power line that is to be protected.

3

The present invention also provides a power line installation including an apparatus for detecting a fault in the power line, the apparatus including:

a first circuit connected in the power line capable of attenuating signals on the line within a first frequency band, centred on a first frequency, substantially more than it attenuates signals outside the first frequency band, a second circuit connected to the power line on one side of the first circuit for extracting signals on the line within a second frequency band that includes the first frequency, and detecting and signalling means for detecting and signalling the relative levels of two signals extracted by the second circuit, the two signals being at respective frequencies which the first circuit is capable of attenuating by different relative amounts.

BRIEF DESCRIPTION OF THE DRAWINGS

By way of example, an illustrative embodiment of the invention will now be described with reference to the accompanying drawings, of which.

DETAILED DESCRIPTION OF THE PREFERRED EMBODIMENTS

Figure 1:
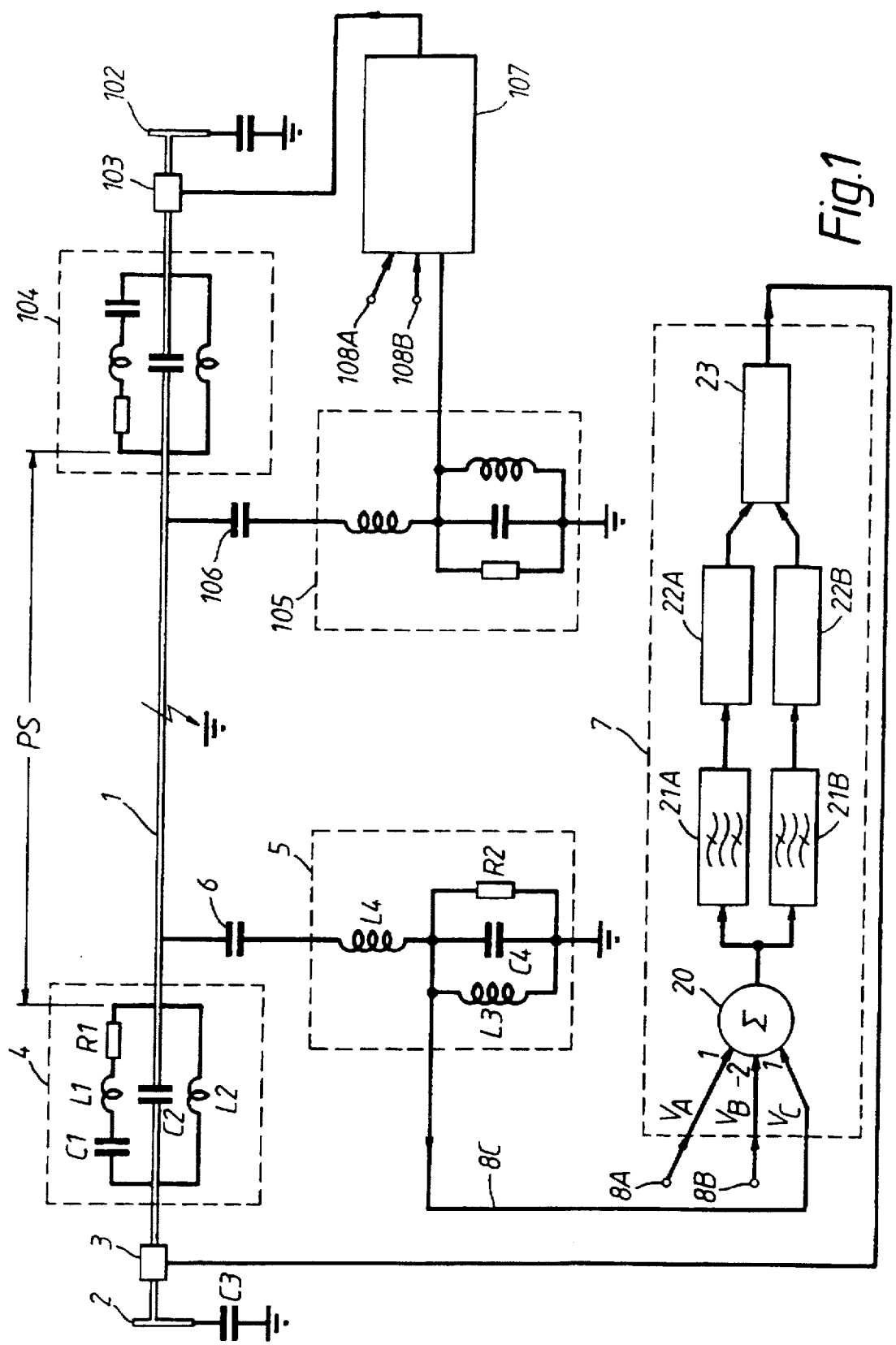
FIG. 1 is a schematic diagram of a section of a power line having a fault detection system.

FIG. 1 shows a length of power line 1 which in this example is typical of a line as used on the United Kingdom national grid and carrying 400 KV at 50 Hz. In FIG. 1 only one of the three phases of supply is shown.

The line terminates at each end in an entirely conventional fashion through busbars 2 and 102. At opposite ends of the line adjacent to the busbars are circuit breakers 3 and 103.

The power line 1 is provided with a fault detection system comprising a pair of tuned attenuator circuits 4 and 104 connected in opposite ends of the line, a pair of tuned circuits 5 and 105 connected via respective coupling capacitors 6 and 106 to the opposite ends of the line and a pair of signal processing circuits 7 and 107 connected to the respective tuned circuits 5 and 105.

Each of the other two phases of the supply is arranged in the same way as the line 1 shown in FIG. 1 with its own busbar 2, 102, circuit breaker 3, 103, attenuator circuit 4, 104, tuned circuit 5, 105 and capacitor 6, 106 and each of the signal processing circuits 7 and 107 has two additional inputs, referenced 8A, 8B and 108A, 108B in FIG. 1, to receive respective signals for the phases.

The fault detection arrangement provided at each end of the line is the same and therefore only the arrangement provided at one end (the left hand end) as viewed in FIG. 1 is shown in detail and will be described.

As shown in FIG. 1, working from the end of the power line 1 that terminates at the busbar 2, there is first the circuit breaker 3, then the tuned attenuator circuit 4 and then the connection of the tuned circuit 5 to the line.

The tuned attenuator circuit 4, which may be referred to as a broadband carrier frequency line trap, and is known per

Figure 2:
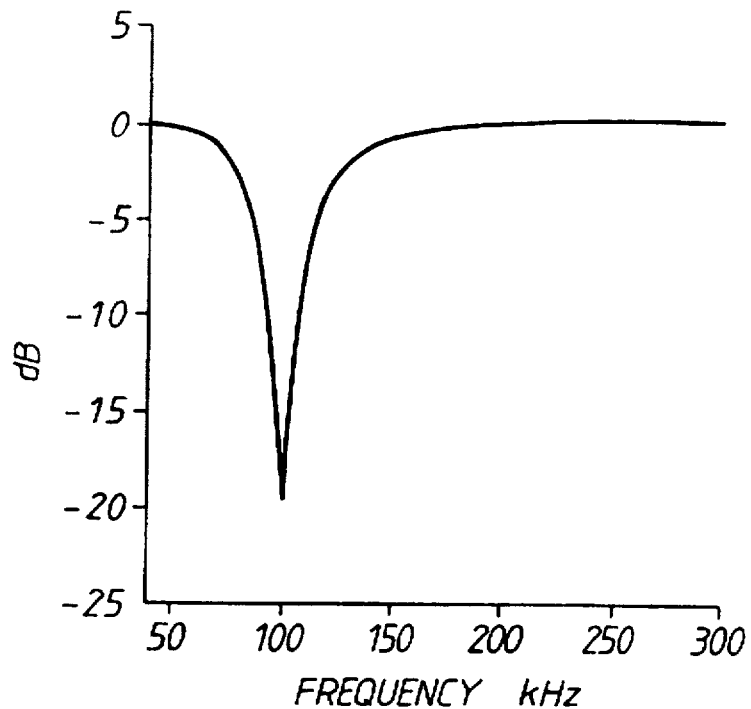
FIG. 2 is a graph of the attenuation provided by a circuit forming part of the fault detection system plotted against frequency.

4 se, comprises a capacitor C1, inductor L1 and resistor R1 connected in series together in parallel with a capacitance C2, and an inductance L2. The values of the various components are chosen such that at a frequency of 100 kHz the impedance of the trap per se is at a maximum. The bandwidth of the trap is about 20 kHz and at 50 Hz the impedance of the trap is negligible. FIG. 2 shows the attenuation in dB of the circuit 4 plotted against frequency.

The capacitance C3 shown in FIG. 1 is the inherent capacitance due to the busbar 2 and is typically about 0.1 μF. Thus, at a frequency of the order of 100 kHz the capacitance C3 provides only a low impedance of about 15 Ω.

The tuned circuit 5 includes an inductor L3, capacitor C4 and resistor R2 connected in parallel with one another and an inductor L4 connected in series between the coupling capacitor 6 and the parallel combination of L3, C4 and R2, the other end of which is connected to earth. The voltage at the junction of the inductor L4 and the parallel combination of L3, C4 and R2 provides an output from the circuit that is connected along a line 8C to the signal processing circuit 7.

The circuit 7 receives inputs along the line 8C and also along the lines 8A and 8B associated with the other phases of the supply and the voltages of $V_A$, $V_B$ and $V_C$ of the three signals are combined in a summation circuit 20. The summation circuit 20 may combine the three voltages $V_A$, $V_B$, $V_C$ in a 1, 0, −1 or more generally a k, o, −k combination. Alternatively the three voltages may be combined in a 1, −2, 1 or more generally a n, −2n, n combination. It is also possible to provide two circuits 7 in parallel, the voltages $V_A$, $V_B$ and $V_C$ being combined differently in the two circuits. The output of the summation circuit 20 is connected to each of two bandpass filters 21A and 21B whose outputs are in turn connected to respective signal analysers 22A and 22B. The outputs of the analysers are compared by a circuit 23 and an output from the circuit 23 is connected to the circuit breaker 3.

In the event of a fault on the power line 1 high frequency signals are generated on the line. The purpose of the fault detection system described above is to detect such signals and furthermore detect whether the fault that has occurred and generated such signals is along the protected section of the line, which is marked PS in FIG. 1, or outside the protected section. If the fault is along the protected section of the line, which may for example be several km long, then the circuit breakers 3 and 103 are actuated and very quickly isolate that part of the line, whereas if the fault is to either side of the protected section, the circuit breakers 3 and 103 are not actuated. The manner in which this is achieved will now be described.

Figure 3:
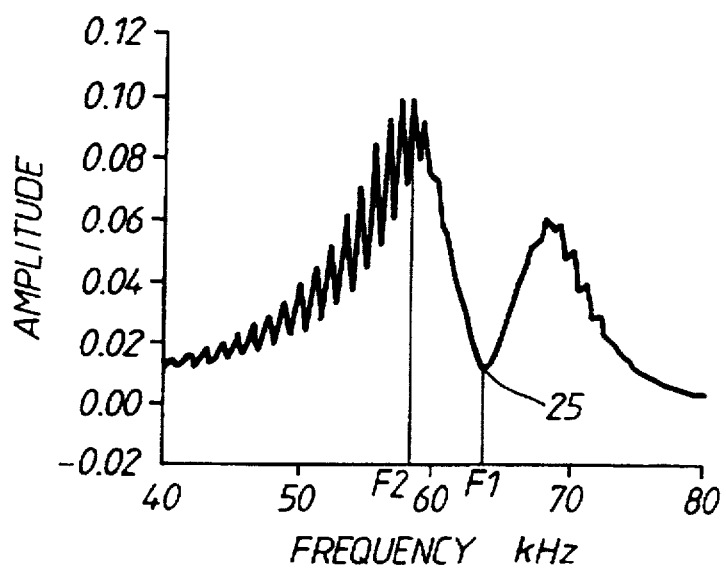
FIG. 3 shows the frequency spectrum of a signal generated within the fault detection system under certain conditions.

If a fault occurs on the protected section of the power line, it will be (as seen in FIG. 1) to the right of the tuned circuit 4 and to the left of tuned circuit 104. High frequency signals generated from the fault will pass to earth along the power line 1 and through the tuned circuit 5 without passing through either of the attenuator circuits 4 or 104. On the other hand if a fault occurs to the left (as seen in FIG. 1) of the attenuator circuit 4, it will not be on the protected section and high frequency signals generated from the fault will pass to earth along the line 1 through both the tuned circuit 5 and the attenuator circuit 4. As a result, the signals passed to the processing circuit differ in that if the signals are not from the protected section of line, they will be attenuated within a narrow waveband. It has already been indicated that the impedance of the circuit 4 per se is at a maximum at 100 kHz and it might therefore be expected that the waveband of attenuation would be centred at 100 kHz. In fact, because of the interaction of the circuit 5 and the circuit 4 with the power line and the rest of the system, the waveband of attenuation is centred at a frequency of about 60 kHz and a series of studies have shown that the waveband of maximum attenuation stays centred at about 60 kHz for a wide variety of fault conditions. FIG. 3 shows the frequency spectrum of the signal output along the line 8C for the case where the fault is outside the protected section of the line. It will be seen that there is a marked dip 25 in the output at the centre of the waveband derived from the attenuation by the circuit 4; the dip is not present when the fault is within the protected section.

The bandpass filters 21A and 21B are centred on frequencies F1 and F2 respectively marked in FIG. 3. Thus in the case where the fault is outside the protected section of the line the magnitude of relative outputs of the two filters is very different from when the fault is within the protected section. The signal analysers 22A and 22B and the circuit 23 serve to check that there is a fault but in the event that the ratio of the magnitudes of the output of the filter 21A to the output of the filter 21B is not above a predetermined level indicating that the fault is outside the protected section, no output is provided to the circuit breaker 3. On the other hand if the ratio of the magnitudes is above the predetermined level indicating that the fault is inside the protected section, an output is provided to actuate the circuit breaker 3.

The precise manner in which the signals from the filters 21A and 21B are processed need not be described in detail. Various processes known per se are suitable. For example the analysers 22A and 22B may generate integrals with respect to time of the respective signals and the ratio of those running integrals may be compared against a preset level.

The operation of the fault detection system at the other end of the protected section of the line, involving circuits 104, 105 and 107, is substantially the same. Thus in response to a fault on the protected section of the line, both circuit breakers 3 and 103 are immediately and independently operated isolating that section.

I claim:

1. A method of detecting a fault in a power line comprising the steps of:
   providing, in the power line, a first circuit capable of attenuating signals within a first frequency band, which is centred on a first frequency, substantially more than it attenuates signals outside the first frequency band, said first circuit being connected to the power line at a first physical location on the power line,
   providing a second circuit connected to the power line at a second physical location on the power line located exclusively either before or after the first physical location on the power line, the second circuit being capable of extracting signals within a second frequency band that includes the first frequency, and
   detecting and signalling the relative levels of two signals extracted by the second circuit, the two signals being extracted at respective different center frequencies which the first circuit is capable of attenuating by different relative amounts.

2. A method according to claim 1, wherein the two signals extracted by the second circuit are such that one of their frequencies lies within the first frequency band and the other frequency lies outside the first frequency band.

3. A method according to claim 1, wherein one of the signals extracted by the second circuit has substantially the frequency on which the first frequency band is centred.

4. A method according to claim 1, which includes detecting and signalling the relative levels of respective first and second pluralities of signals extracted by the second circuit, the first plurality of signals covering a first frequency range which is attenuated substantially more than the frequency range of the second plurality of signals.

5. A method according to claim 1, in which a circuit breaker in the power line is provided and the actuation of the circuit breaker is dependent upon the relative levels of the signals extracted by the second circuit.

6. A method according to claim 5 in which the circuit breaker is actuated only if the signals are ascertained not to have been substantially attenuated by the first circuit.

7. A method according to claim 1 in which the first frequency is between 10 kHz and 500 kHz.

8. A method according to claim 7 in which the first frequency is about 60 kHz.

9. A method according to claim 7 in which the second frequency band has a width of 10 to 50 kHz.

10. A method according to claim 9 in which the second frequency band has a width of about 20 kHz.

11. A method according to claim 1 in which the step of detecting the relative levels of the extracted signals comprises ascertaining the ratio of the magnitude of the signals in one frequency band to the magnitude of the signals in another frequency band.

12. A method of detecting a fault in a power line according to claim 1 is carried out at the opposite ends of a length of the power line that is to be protected.

13. Power line installation comprising an apparatus for detecting a fault in the power line, the apparatus including:
   (a) an attenuating circuit connected to the power line at a first location between two points on the power line, the attenuating circuit being capable of attenuating signals passing from one of said two points to the other of said two points and being so configured and arranged that signals within a first frequency band, which is centred on a first frequency, are attenuated substantially more than signals outside the first frequency band,
   (b) an extracting circuit connected to the power line at a second location, said second location being exclusively to one side of the region between said two points, the extracting circuit being capable of extracting signals within a second frequency band that includes the first frequency, and
   (c) detecting and signalling means for detecting and signalling the relative levels of two signals extracted by the extracting circuit, the two signals being centred on respective different frequencies which the attenuating circuit is capable of attenuating by different relative amounts.

14. A power line installation including an apparatus for detecting a fault in the power line, the apparatus comprising:
   a first circuit connected in the power line capable of attenuating signals on the line within a first frequency band, centred on a first frequency, substantially more than it attenuates signals outside the first frequency band, said first circuit being connected to the power line at a first physical location on the power line,
   a second circuit connected to the power line at a second physical location on the power line located exclusively either before or after the first physical location on the power line for extracting signals on the line within a second frequency band that includes the first frequency, and
   detecting and signalling means for detecting and signalling the relative levels of two signals extracted by the second circuit, the two signals being extracted at respective different center frequencies which the first circuit is capable of attenuating by different relative amounts.

15. A power line installation according to claim 14, further including a circuit breaker in the power line, actuation of the circuit breaker being dependent upon the relative levels of the signals extracted by the second circuit.

16. A power line installation according to claim 14 in which a respective apparatus for detecting a fault in the power line is provided at each end of a section of power line to be protected.

17. A power line installation according to claim 14, for carrying out the method of claim 1.

18. A method of detecting a fault in a power line including the steps of:
   providing, in the power line, a first circuit capable of attenuating signals within a first frequency band, which is centred on a first frequency, substantially more than it attenuates signals outside the first frequency band,
   providing a second circuit connected to the power line, said second circuit being electrically connected to the first circuit, and said second circuit being capable of extracting signals within a second frequency band that includes the first frequency,
   detecting, within said second frequency band, a first signal centered at a frequency F1,
   detecting, within said second frequency band, a second signal centered at a frequency F2, wherein F2 differs from F1, and wherein the first circuit attenuates the first and second signals by different amounts, and
   comparing the level of the first signal with the level of said second signal.

19. A method as claimed in claim 18, wherein said first circuit is located at a first physical location along the length of said power line and said second circuit is located at a second physical location, different from said first location, along the length of the power line.

20. A power line installation including an apparatus for detecting a fault in the power line, the apparatus including:
   a first circuit connected in the power line capable of attenuating signals on the line within a first frequency band, centered on a first frequency, substantially more than it attenuates signals outside the first frequency band,
   a second circuit connected to the power line, said second circuit being electrically connected to the first circuit, said second circuit being capable of extracting signals on the line within a second frequency band that includes the first frequency, and
   a detecting and signalling device for detecting and signalling the relative levels of two signals extracted by the second circuit, the two signals being extracted at respective different center frequencies which the first circuit is capable of attenuating by different relative amounts.

21. A power line installation according to claim 20, wherein said first circuit is located at a first physical location along the length of said power line and said second circuit is located at a second physical location, different from said first location, along the length of the power line.

22. A power line installation according to claim 20, wherein said detecting and signalling device includes a first and second filters for extracting said two signals at said respective different center frequencies which the first circuit is capable of attenuating by different relative amounts.

23. A method of detecting a fault in a power line comprising the steps of:
   (a) providing an attenuating circuit connected to the power line at a first location between two points on the power line, the attenuating circuit being capable of attenuating signals passing from one of said two points to the other of said two points and being so configured and arranged that signals within a first frequency band, which is centred on a first frequency, are attenuated substantially more than signals outside the first frequency band,
   (b) providing an extracting circuit connected to the power line at a second location, said second location being exclusively to one side of the region between said two points, the extracting circuit being capable of extracting signals within a second frequency band that includes the first frequency, and
   (c) detecting and signalling the relative levels of two signals extracted by the extracting circuit, the two signals being centred on respective different frequencies which the attenuating circuit is capable of attenuating by different relative amounts.

* * * * *